Aug. 4, 1964  D. C. SPAULDING, JR  3,142,972
MISALIGNMENT COUPLING
Filed Sept. 10, 1962
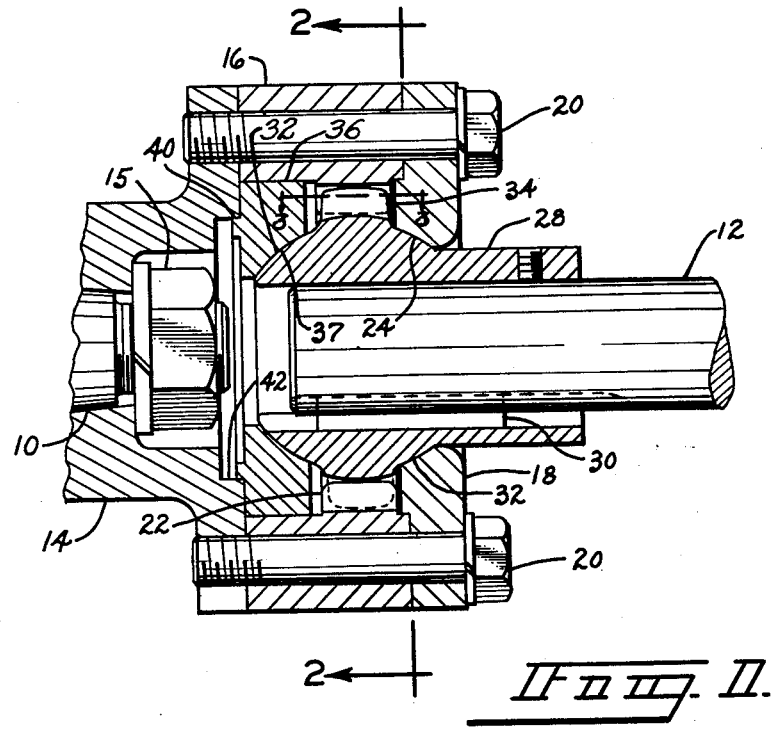
Fig. 1.
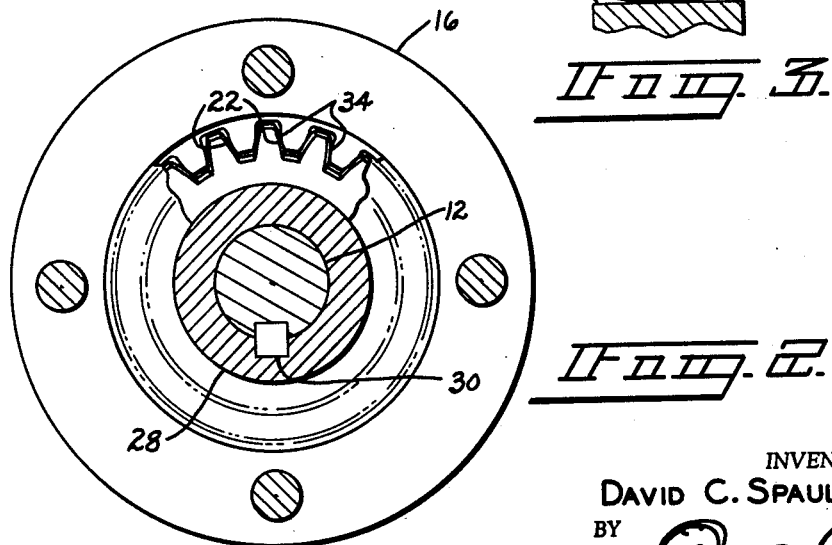
Fig. 3.
Fig. 2.
INVENTOR.
DAVID C. SPAULDING JR
BY
ATTORNEYS

3,142,972
MISALIGNMENT COUPLING
David C. Spaulding, Jr., Toledo, Ohio, assignor to The Bunting Brass and Bronze Company, Toledo, Ohio, a corporation of Ohio
Filed Sept. 10, 1962, Ser. No. 222,530
1 Claim. (Cl. 64—7)

This invention relates to a coupling to be interposed between a driving and a driven shaft for the purpose of compensating for angular misalignment between the shafts. The primary object of the invention is to provide a so-called misalignment coupling which is capable not only of transmitting the required torque between the angularly misaligned shafts, but is also capable of taking any periodic or aperiodic thrust loads that might arise.

It has heretofore been proposed to provide a "gear" type of misalignment coupling comprising a series of teeth on a hub member meshing with an equally numerous series of teeth on a surrounding sleeve. In general, the teeth on the hub member are cut as gear teeth while the teeth on the sleeve member are cut as mating spline teeth. Since there is no relative rotation between the parts, they do not truly comprise a gear. As they are presently known, these couplings have been capable of transmitting torque between angularly misaligned shafts and are, therefore, very useful in the drive train between an internal combustion engine and its load which may be, for example, a boat propeller. Since a drive train of this nature always provides a thrust bearing against which the reaction of the load device is taken, it has been customary to omit any thrust capability from the misalignment coupling itself. It has been found, however, that for many installations it is highly desirable and necessary to have thrust capabilities in the misalignment coupling to carry the action of thrust transmitted through the drive train.

The present invention comprises in combination with the hub and outer coupling or sleeve member, a spherical body formed on the hub and a freely mounted thrust pad in engagement with the spherical body at one side of the hub teeth, together with a second thrust pad in engagement with the spherical surface of the hub on the opposite side of the teeth so that thrust loads in either direction may be accommodated by the new coupling.

More specific advantages of the invention will become apparent from the following description of a preferred form thereof, reference being had to the accompanying drawings, in which:

FIGURE 1 is a central longitudinal sectional view of a misalignment coupling incorporating the present invention;

FIG. 2 is a section on line 2—2 of FIG. 1; and

FIG. 3 is a fragmentary sectional view on line 3—3 of FIG. 1 showing the formation of the hub and sleeve teeth diagrammatically.

Referring to the drawings, 10 designates a driving shaft and 12 designates a driven shaft between which the coupling of the present invention is interposed. A drive member 14 is mounted for rotation with the driving shaft and is held in position by any suitable device such as a retaining nut 15.

The outer coupling member comprises an annulur sleeve 16 and an end retainer 18 held to the drive member 14 by a peripheral series of spaced retainer bolts 20. The sleeve 16 is provided with a series of internal teeth 22 through which the torque of the coupling is transmitted. The retainer 18 extends radially inward beyond the teeth 22 and is provided at its lower and inner side with a spherical surface 24 which forms a thrust pad under certain driving conditions.

The driven shaft 12 is connected to a hub of the coupling member which is designated 28, the hub being keyed to the driven shaft as by a key 30. The hub is provided with a spherical surface 32 engaging the surface 24 of the retainer 18 and extending from the spherical surface are mating coupling teeth 34 which mesh with the teeth 22 of the sleeve member 16.

In the preferred form of the invention the hub teeth 34 are curved in two directions; that is, the crown of each tooth is essentially a part of a sphere having its center preferably at the center of the driven shaft 12 and in a plane axially central of the body of the tooth, and the flanks of the teeth are cut as convex spherical surfaces so that the teeth are free to rock with respect to the sleeve teeth as the coupling rotates in a misaligned condition. Curvature of the teeth both at the crown and at the flank surfaces increases the misalignment capacity of the coupling by prevent binding and the application of high unit forces on the ends of the teeth as would occur if these were flat or straight surfaces.

The coupling according to the present invention includes also a free thrust member or pad 36 having a spherical active face 37 in engagement with the spherical surface 32 of the hub on the side towards the drive member 14. The thrust pad 36 is located in its radial position preferably by a locating flange 40 which is freely received in a recess 42 in the center of the drive member 14. By making the thrust member free to rotate within the drive member and sleeve the tolerances which must be held in the manufacture of the parts may be greatly reduced since the spherical surface of the hub and the mating spherical surface of the thrust member accommodate themselves in a relatively short time.

The operation of the coupling according to the present invention will be apparent from the above, but may be summarized as follows: Torque from the driving shaft 10 is applied to the coupling through the drive member 14 and sleeve 16 to the sleeve teeth 22 and is thence taken to the hub teeth 34, the hub 28 and into the driven shaft 12. The fact that the axis of the driven shaft 12 is slightly angularly misaligned with respect to the axis of the driving shaft 10 by means only that the force is applied between the teeth at different points depending on the degree of misalignment since the teeth on the hub and the teeth on the sleeve will rock with respect to each other as the driving and driven shafts rotate. This rocking action is readily accommodated by the curvature of the crown and flank of the hub teeth 34.

In the event that a thrust load occurs which would tend to "crowd" the driving and driven shafts, the spherical surface 32 on the hub will transmit this force into the freely rotatable thrust pad 36 and thence into the drive member 14. Should the thrust force be in the opposite direction the spherical surface 24 machined into the retainer 18, and the mating spherical surface on the hub member will accept the force and transmit it to the drive member 14 from which the force will be taken through the retainer nut 15 and into the driving shaft 10.

The present invention is particularly useful in the drive trains of small boats in which the engine mounting is frequently such that the engine crankshaft and the propeller shaft are angularly out of alignment. It also frequently occurs that the thrust bearings provided for the propeller shaft absorb most of the thrust, but a certain proportion of it is transmitted through the propeller shaft in the direction of the engine. By interposing the misalignment coupling constructed in accordance with the present invention, the thrust load passing in the direction of the engine can be accommodated without imposing unusual stresses or setting up unusual vibrations in the drive train.

While the invention has been described in conjunction with a specific form and disposition of the parts, it should be expressly understood that numerous modifications and changes may be made therein without departing from the scope of the appended claim.

What I claim is:

In a misalignment coupling for connecting a driving and driven shaft for transmission of torque and thrust from the driving shaft to the driven shaft, the combination of:
- (A) a hub fastened to one of said shafts and having
  - (1) a spherical body and
  - (2) a series of engaging teeth projecting radially outwardly from the periphery of said spherical body,
    - (a) said teeth having spherically formed crown portions and spherically convex flanks to accommodate rocking movement of the coupling,
    - (b) the center of curvature of said crown portions of said teeth lying at the center of said spherical body,
- (B) an outer coupling member surrounding said hub and including
  - (1) a driving member fastened to the other of said shafts,
  - (2) a sleeve member having internal teeth in mesh with the teeth of said hub,
    - (a) said internal teeth having straight crowns,
  - (3) a freely mounted thrust pad between said hub and said driving member at one side of said hub teeth,
    - (a) said thrust pad abutting said driving member and freely mounted for rotation with respect to both said driving member and said hub,
    - (b) said thrust pad having a diameter larger than the distance across the diametrically opposed internal teeth,
  - (4) a second thrust pad in engagement with the spherical body of said hub on the side of said hub teeth opposite said freely mounted thrust pad, and
- (C) peripherally-spaced, axially-extending means to hold together said driving member, said sleeve member and said second thrust pad of said outer coupling member in assembled relation around said hub.

References Cited in the file of this patent

UNITED STATES PATENTS

| | | |
|---|---|---|
| 1,098,101 | Edwards | May 26, 1914 |
| 1,328,449 | Ream | Jan. 20, 1920 |
| 2,045,030 | Thompson | June 23, 1936 |
| 2,682,760 | Shenk | July 6, 1954 |
| 2,893,222 | Albedyhl et al. | July 7, 1959 |
| 2,922,294 | Wildhaber | Jan. 26, 1960 |
| 3,017,756 | Sharp | Jan. 23, 1962 |

FOREIGN PATENTS

| | | |
|---|---|---|
| 201,873 | Great Britain | Aug. 30, 1923 |